United States Patent [19]
Merriken et al.

[11] Patent Number: 6,078,718
[45] Date of Patent: Jun. 20, 2000

[54] STRAIN RELIEF DEVICE FOR PLURALITY OF OPTICAL RIBBON FIBERS

[75] Inventors: James R. Merriken, Hudson; Steven L. Stallings, Newton, both of N.C.

[73] Assignee: Siecor Corporation, Hickory, N.C.

[21] Appl. No.: 09/046,360

[22] Filed: Mar. 23, 1998

Related U.S. Application Data

[63] Continuation of application No. 08/665,436, Jun. 18, 1996, Pat. No. 5,734,777.

[51] Int. Cl.⁷ ..................................................... G02B 6/00
[52] U.S. Cl. ............................................................. 385/135
[58] Field of Search ................................... 385/130–135, 385/141, 147

[56] References Cited

U.S. PATENT DOCUMENTS

| | | | |
|---|---|---|---|
| 4,046,454 | 9/1977 | Pugh III | 385/89 |
| 5,134,673 | 7/1992 | Stephenson et al. | 385/56 |
| 5,155,787 | 10/1992 | Carpenter et al. | 385/98 |
| 5,195,153 | 3/1993 | Finzel | 385/70 |
| 5,293,443 | 3/1994 | Eoll et al. | 385/114 |
| 5,345,323 | 9/1994 | Basavanhally et al. | 385/59 |
| 5,440,657 | 8/1995 | Essert | 385/71 |
| 5,870,519 | 2/1999 | Jenkins et al. | 385/135 |
| 5,970,199 | 10/1999 | Minchey et al. | 385/134 |

*Primary Examiner*—Akm E. Ullah

[57] ABSTRACT

A device and method are provided to relieve strain in a plurality of optical ribbon fibers. In one embodiment, a tray has two sidewalls defining a passageway therebetween for receiving a grommet. The grommet defines a channel sized for receiving therethrough the plurality of optical ribbon fibers in a stacked arrangement. A compression clip fits over the grommet to compress the grommet proximal the channel the compress the optical ribbon fibers against each other in the stack.

2 Claims, 4 Drawing Sheets

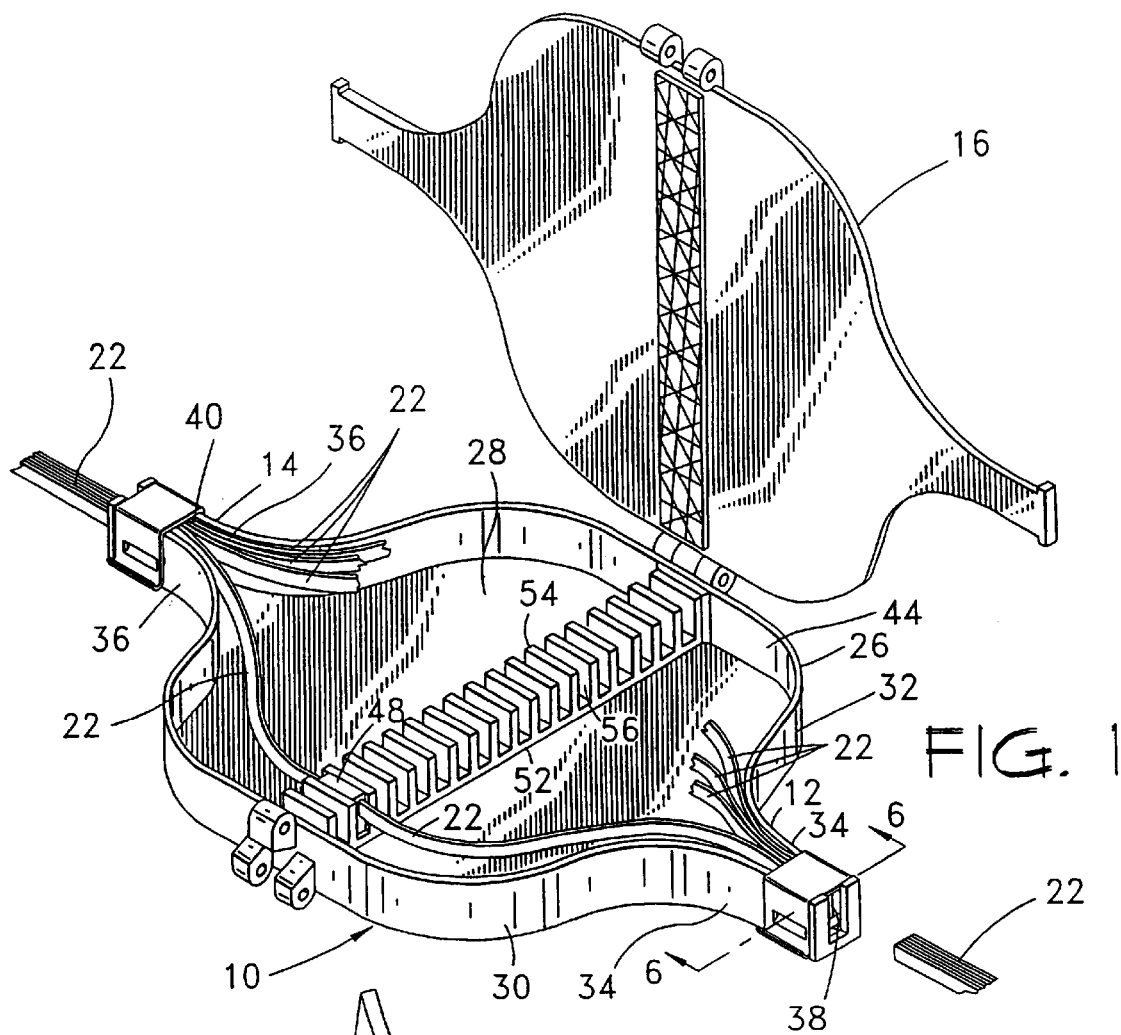
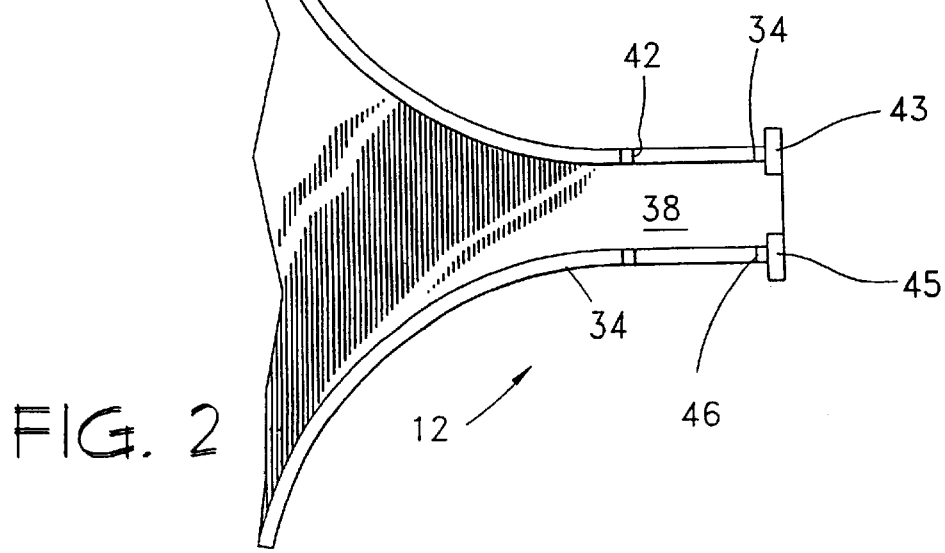

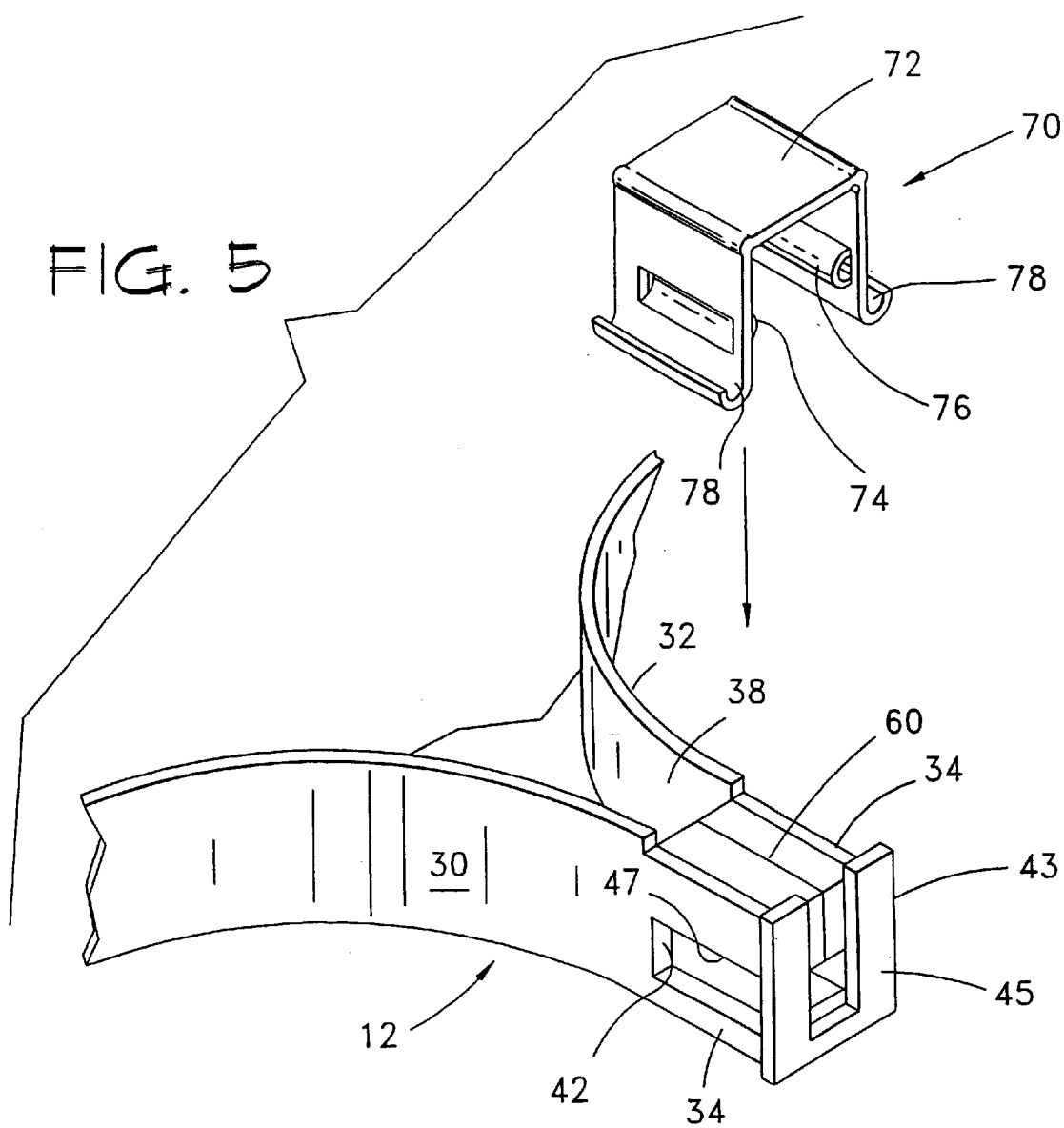

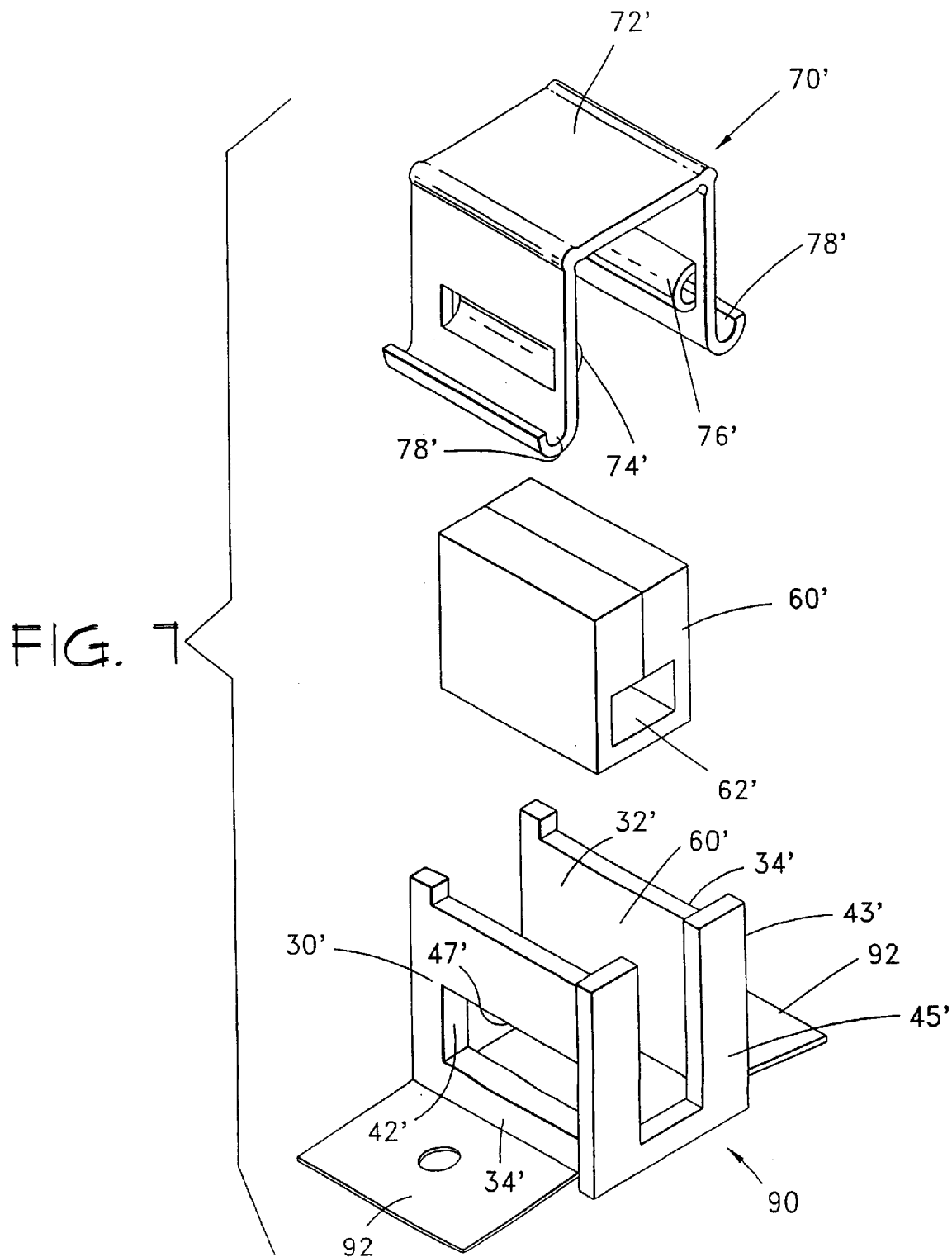

STRAIN RELIEF DEVICE FOR PLURALITY OF OPTICAL RIBBON FIBERS

This application is a continuation of prior application Ser. No. 08/665,436, filed on Jun. 18, 1996, now U.S. Pat. No. 5,734,777.

TECHNICAL FIELD OF THE INVENTION

The present invention relates to a device for strain relieving a plurality of optical ribbon fibers. In one aspect, the present invention relates to such a device for strain relieving the plurality of optical ribbon fibers in a stacked relationship to each other.

BACKGROUND OF THE INVENTION

Optical ribbon fibers which have a row of fibers sheathed together in a flat ribbon shape are being used in increasingly more applications. Ribbon fibers are commonly used with multi-fiber connectors such as the MT type of ferrule and connector. U.S. Pat. No. 5,214,730 to Nagasawa et al. discloses several embodiments of MT ferrules and connectors. Additionally the ends of ribbon fibers may be furcated and each individual fiber or pair of fibers terminated in a distinct connector. As ribbon fiber increases in use, there is a growing need to be able to strain relieve optical ribbon fibers to prevent an excessive strain or pull on the ribbon fibers from damaging an optical ribbon fiber connection or other joint. Furthermore, a need exists for a strain relief device that can accommodate a plurality of optical ribbon fibers together in order to conserve space and better manage the ribbon fibers.

One example of an application where strain relief is needed is where two large fiber optic cables, each comprising a plurality of optical ribbon fibers, are joined together in a cylindrical closure. Typically, the two pluralities of optical ribbon fibers are joined together either by splicing or some type of connection, e.g. MT ferrules, and the resulting joints are then placed in a series of trays inside the closure. During the long, tedious process of joining the ribbon fibers to each other and placing the joints in the trays, it is not unlikely that a craft person will inadvertently snag or pull one or more of the optical ribbon fibers. Therefore, a need exists to be able to strain relieve optical ribbon fibers to prevent transference of a strain to the joints in the tray. Furthermore, a need exists to be able to strain relieve optical ribbon fibers in groups in order to conserve space and better manage the ribbon fibers.

SUMMARY OF THE INVENTION

The present invention provides apparatus and a method for strain relieving a plurality of optical ribbon fibers in a compact and easy to use manner. In one aspect of the present invention, a strain relief tray is provided that is adapted for holding a plurality of joints between the ends of a first plurality of optical ribbon fiber and the ends of a second plurality of optical fibers. The optical ribbon fibers of the first plurality are flat and stackable. The tray comprises a housing with a first end that defines a first passageway into the housing and sized to receive therethrough the first plurality of optical ribbon fibers with the optical ribbon fibers arranged in a stack thereby defining two outside ribbon fibers of the stack. The housing defines a cavity in communication with the first passageway and that is of sufficient size for receiving therein the plurality of joints between the ends of the first plurality of optical ribbon fibers and the ends of the second plurality of optical fibers.

The tray further comprises a compression clip removably locatable on the housing at the first passageway of he housing, the clip configured such that when the stack of optical ribbon fibers is placed in the first passage way, the clip can be located on the housing to compress the optical ribbon fibers and fix the stack of optical ribbon fibers relative to the housing such that any strain on the optical ribbon fibers occurring outside of the housing is relieved at the compression clip and prevented from being transferred to the joints in the cavity.

Another aspect of the present invention provides a strain relief mount for strain relieving a plurality of optical ribbon fibers. The strain relief mount comprises a grommet defining a channel sized for receiving therethrough a plurality of optical ribbon fibers when the plurality of optical ribbon fibers are arranged in a stack at the desired location to relieve strain. The stain relief mount further comprises a compression clip for compressing the grommet against opposite sides of the channel such that when the stack of optical ribbon fibers is in the channel, the compression clip compresses the optical ribbon fibers against each other in the stack sufficiently to relieve a strain on one or more of the optical ribbon fibers to the clip.

Another aspect of the present invention provides a method for relieving strain in a plurality of optical ribbon fibers. The method comprises the steps of arranging the plurality of optical ribbon fibers at a desired location along the plurality of optical ribbon fibers, compressing the stack of optical ribbon fibers in a direction perpendicular to the flatness of the ribbon fibers, and fixing the compressed stack such that a strain of one or more of the optical ribbon fibers is prevented from transferring beyond the compresses stack.

The present invention provides a compact apparatus and method for strain relieving a large number of optical ribbon fibers simultaneously.

BRIEF DESCRIPTION OF THE DRAWINGS

FIG. 1 is a perspective view of the preferred embodiment of the strain relief tray of the present invention;

FIG. 2 is a top view of one end of the preferred embodiment of the strain relief tray of the present invention;

FIG. 5 is a perspective view of the preferred embodiment of the grommet installed in the end of the tray of the present invention with the compression clip disposed thereover;

FIG. 6 is a cross-section along line 6—6 of FIG. 1; and

FIG. 7 is an exploded perspective view of the preferred embodiment of the strain relief mount of the present invention.

DETAILED DESCRIPTION

Figure 3:
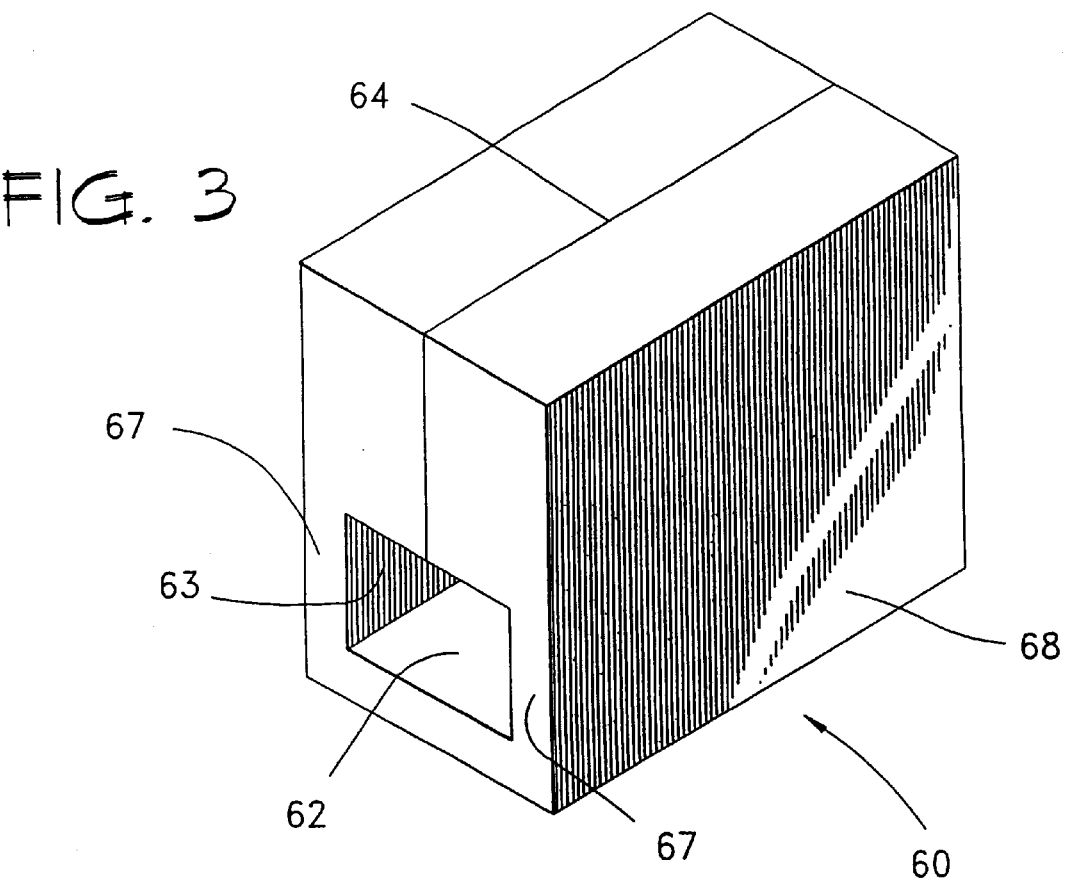
FIG. 3 is a perspective view of the preferred embodiment of the grommet used in the present invention.

With reference to FIGS. 1–6, the preferred embodiment of strain relief tray 10 as one aspect of the present invention is disclosed. Strain relief tray 10 has first end 12 and second end 14 each receiving a plurality of ribbon fibers 22 therethrough. First end 12 of tray 10 is detailed in FIGS. 2 and 5. For purposes of clarity, only a few example ribbon fibers 22 are fully depicted in tray 10. Tray 10 has housing 26 which comprises generally planar bottom plate 28 with first side wall 30 and second side wall 32 extending generally perpendicularly therefrom. An optional lid 16 is shown hinged to second side wall 32. Alternatively, another tray 10 could be hinged to second side wall 32 to act in place of lid 16.

Each side wall 30, 32 has first end 34 and second end 36. Side walls 30, 32 converge towards each other at first ends 34 until first ends 34 are spaced apart to define first passageway 38 at first end 12 of tray 10. Side walls 30, 32 converge towards each other at second ends 36 until second ends 36 are spaced apart to define second passageway 40 at second end 14 of tray 10. A longitudinal direction is defined as extending from first end 12 to second end 14.

Ends 12, 14 of tray 10 have a U-shaped cross-section opening upward defined by bottom plate 28 and opposed sidewalls 30, 32. In the preferred embodiment, first ends 34 and second ends 36 of sidewalls 30, 32 terminate at U-shaped flanges 43 either formed therein or attached thereto. U-shaped flanges have end face 45 facing away from housing 26. Sidewalls 30, 32 define cut-outs 42 proximal each end thereof. At each end 12, 14 of housing 26, cut-outs 42 are located opposite of each other and spaced from end face 45 of U-shaped flanges 43 in the longitudinal direction to define at least strain surface 46 toward end face 45 of U-shaped flange 43 and top surface 47 at the top of cut-out 42.

Housing 26 defines cavity 44 which is sized to receive the plurality of joints 48 made between the plurality of optical ribbon fibers 22 entering first passageway 38 and the plurality of optical ribbon fibers entering second passageway 40. In the preferred embodiment, tray 10 has retaining member 52, shown as comb 54, as an option for retaining joints 48 in housing 26. Comb 54 defines a series of slots 56 that are sized to receive an individual joint 48. Any type of joint 48 may be housed in tray 10, for example, fusion splices, mechanical splices, and/or various connectors. Other suitable retaining members 52 may be used as is needed for the particular type of joint 48 being stored in tray 10.

Figure 4:
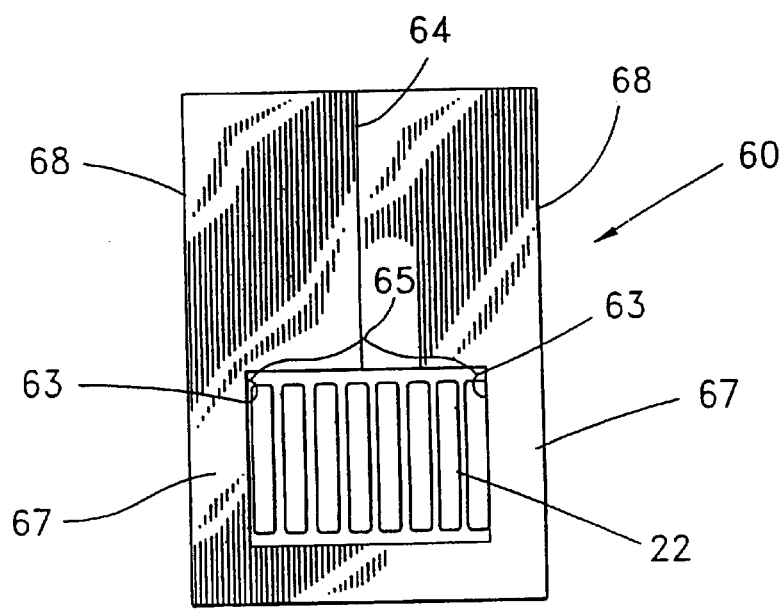
FIG. 4 is an end view of the grommet of FIG. 3 with optical ribbon fibers shown in cross-section.

First and second passageways 38, 40 at first end 12 and second end 14, respectively, of housing 26 are sized to receive grommet 60 shown in FIGS. 3 and 4. Grommet 60 is of a generally block shape and defines channel 62 extending longitudinally therethrough. Channel 62 has opposed channel sides 63 that have a height at least as wide as ribbon fibers 22. Grommet has width 66 spanning between opposite outer sides 68. Grommet 60 has thin wall portions 67 defined between outer sides 68 and channel sides 63. Grommet 60 also has slit 64 in a longitudinal plane in communication with channel 62. Grommet 60 is preferebly made from urethane or other material that is sufficienly resilient such that it can be spread apart at slit 64 to bend thin wall portions 67 and create an opening through which ribbon fibers 22 can be inserted into and removed from channel 62.

Channel 62 is dimensioned to receive a plurality of optical ribbon fibers 22 stacked on each other. FIG. 4 illustrates a cross-section of stack 65 of a plurality of optical ribbon fibers 22 disposed in channel 62. With respect to the orientation of tray 10 in the drawings, ribbon fibers are placed with their wide dimension oriented vertically such that the height of stack 65 is equal to the width of ribbon fibers 22.

FIGS. 5 and 6 show the insertion of grommet 60 into first end 12 of housing 26. In operation, optical ribbon fibers are inserted into channel 62 of grommet 60 when grommet 60 is outside passageway 38 as shown in FIG. 4. After optical ribbon fibers 22 have been inserted into channel 62 of grommet 60, grommet 60 is inserted into first passageway 38 between sidewalls 30, 32. A slight press fit is preferred between outer sides 68 of grommet 60 and sidewalls 30, 32 to maintain grommet 60 in place in passageway 38. Grommet 60 and first end 12 of housing 26 are configured such that stack 65 of ribbon fibers 22 is located between cut-outs 42 of sidewalls 30, 32 when grommet 60 is in place in passageway 38.

Compression clip 70 is shown in FIGS. 1, 5 and 6. Compression clip 70 has generally C-shaped portion 72 that defines first compression point 74 and second compression point 76 spaced apart from each other. The space between first and second compression points 74, 76 is less than width 66 of grommet 60. In operation, after grommet 60 is in place in first passageway 38 as shown in FIG. 6, compression clip 70 is then clipped over first end 12 of tray 10 until first and second compression points 74, 76 snap into cut-outs 42 and compress against thin wall portions 67 of grommet 60 at the approximate midpoint of the height (equal to width of ribbon fiber 22) of stack 65 of optical ribbon fibers 22. Compression clip 70 is sufficiently flexible outwardly to allow first and second compression points 74, 76 to flex over first end 12. Compression clips 70 are provided with outwardly extending flanges 78 which allow for a simple tool to be used for spreading C-shaped portion 72 of clips 70 to install and remove-clips 70.

Clips 70 are positively limited from longitudinal movement relative to ends 12, 14 of housing 26 by virtue of strain surface 46 of cut-outs 42 prevent longitudinal movement of compression points 74, 75 and/or by virtue of U-shaped flange preventing longitudinal movement of clip 70.

A total force of around 2 pounds applied by compression clip 70 against thin wall portions 67 is generally sufficient to effectively strain relieve ribbon fibers 22 of stack 65 by virtue of the forced friction occurring between adjacent ribbon fibers 22 of stack 65 and between the outside ribbon fibers of stack 65 and channel sides 63 of grommet 60 that transfers a sufficiently excessive strain to the compression points 74, 76 of clips 70 and ultimately to positive longitudinal engagement between clips 70 and ends 12, 14 of housing 26. Clips 70 may also impose sufficient friction between side walls 30, 32 and grommet 60 that may relieve some level of strain before clips 70 are longitudinally limited by ends 12, 14 of housing 26. Grommet 60 and compression clip 70 can be sized and configured such that a downward force is also exerted against stack 65 of ribbon fibers 22.

Another aspect of the present invention is a strain relief structure for a plurality of optical ribbon fibers. Such a structure is not limited to application with a tray but may be used anywhere it is desired to strain relieve optical ribbon fibers, for example, routing of optical ribbon fibers in a fiber distribution frame environment. FIG. 9 shows strain relief mount 90 which can be fixedly attached to any structure such as a fiber distribution frame, closure or other structure, by any suitable means, for example, mounting lugs 92. Strain relief mount 90 comprises spaced apart walls 30', 32' with cutouts 42'. Strain relief mount 90 also comprises grommet 60' and compression clip 70' that are preferably the same design as grommet 60 and compression clip 70 used with tray 10. Compression clip 70' is snapped over walls 30', 32' until compression points 74', 76' snap into cutouts 42' and press against thin wall portions 67' of grommet 60' at a point approximately at the middle of the height of stack 65 of optical ribbon fibers 22 disposed in channel 62' of grommet 60'. The operation of strain relief mount 90 is the same as the strain relief device at ends 12, 14 of tray 10.

It should be understood that compression clip 70 is merely one alternative of imparting compression against grommet 60. Other devices can be used, for example, a simple set screw type mechanism, or having a snap fit mechanism between grommet 60 and side walls 30, 32. Compression clip 70 is preferred over a set screw in that the degree of compression is not variable with the compression clip and therefore not subject to over compression. Compression clip 70 can be designed to be hinged at one side to sidewall 30 or 32 to prevent inadvertent loss of the compression clips.

The method of the present invention comprises the step of compressing a stack of ribbon fibers with a device in a direction perpendicular to the width of the individual ribbon fibers, and fixing the device relative to a joint of the ribbon fibers such that a strain on the opposite side of the device from the joint is not transferred to the joint.

Although, the present invention has been described with respect to certain embodiments, it should be understood that various changes, substitutions and modifications may be suggested to one skilled in the art and it is intended that the present invention encompass such changes, substitutions and modifications as fall within the scope of the appended claims.

We claim:

1. A method for relieving strain in a plurality of optical ribbon fibers comprising the steps of:
   (a) arranging the plurality of optical ribbon fibers at a desired location along the plurality of ribbon fibers in a stack thereby defining two outside ribbon fibers of the stack;
   (b) compressing the stack of optical ribbon fibers in a direction perpendicular to the flatness of the ribbon fibers; and
   (c) fixing the stack such that a strain on one or more of the optical ribbon fibers will be relieved at the compressed stack.

2. The method claim 1, wherein the stack of ribbon fibers is compressed by a compression clip that bears inwardly against each outside ribbon fiber of the stack.

* * * * *